United States Patent
Tseng (12)

(10) Patent No.: US 6,358,345 B1
(45) Date of Patent: Mar. 19, 2002

(54) METHOD FOR PRODUCING POROUS SPONGE LIKE METAL OF WHICH DENSITY OF PORES IS CONTROLLABLE

(76) Inventor: Shao-Chien Tseng, No. 130, Sec. 2, Yang-Shin Rd., Yang-Mei 326 Taoyuan (TW)

( * ) Notice: Subject to any disclaimer, the term of this patent is extended or adjusted under 35 U.S.C. 154(b) by 0 days.

(21) Appl. No.: 09/441,111

(22) Filed: Nov. 16, 1999

(51) Int. Cl.$^7$ .......................... B32B 31/00; B32B 31/12
(52) U.S. Cl. ...................... 156/89.11; 156/77; 156/155; 156/89.23; 156/89.28; 156/245
(58) Field of Search ............................ 156/77, 78, 155, 156/182, 242, 245, 89.11, 89.23, 82.28; 428/613; 75/415

(56) References Cited

U.S. PATENT DOCUMENTS

| | | | |
|---|---|---|---|
| 3,773,098 A | * | 11/1973 | Rock |
| 4,917,857 A | * | 4/1990 | Jaeckel et al. |
| 5,112,697 A | * | 5/1992 | Jin et al. |
| 5,334,236 A | * | 8/1994 | Sang et al. |
| 6,024,157 A | * | 2/2000 | Donahue et al. |
| 6,162,310 A | * | 12/2000 | Tseng |

FOREIGN PATENT DOCUMENTS

| DE | 2 218 455 | * 11/1974 |
|---|---|---|
| WO | 97/31738 | * 9/1997 |

* cited by examiner

Primary Examiner—Curtis Mayes
(74) Attorney, Agent, or Firm—Pro-Techtor International Services

(57) ABSTRACT

A method for producing a sponge like metallic structure of which density of pores is controllable, organic blanks are selected according to the shapes and sizes of the pores to be shaped and are dipped with organic medium, the blanks are agglomerated in a step of accumulation and are baked for shaping, the blanks and the organic medium thus form a shaped embryo by adhering. The embryo is processed by dipping with refractory mortar in vacuum, and is dried to form a refractory layer, then is dealt with by sintering in high temperature to effect carbonizing and disappearance of the blanks and organic medium by burning, and forms shaped ceramic shells distributed with mutually communicating pores and communicating areas and with gaps around the pores and communicating areas. An equipment for vacuum founding is used to practice a preheating step on the shaped ceramic shells, and then pressing found the shaped ceramic shells which are cast with metallic melt to fill in the gaps and to envelop the communicating areas and pores, thus a metal article with porous sponge like structure having pores communicating with one another is formed.

3 Claims, 4 Drawing Sheets

METHOD FOR PRODUCING POROUS SPONGE LIKE METAL OF WHICH DENSITY OF PORES IS CONTROLLABLE

BACKGROUND OF THE INVENTION

1. Field of the Invention

The present invention is related to a method for producing metal with a sponge like structure of which density of the pores is controllable. And especially is related to a method derived from the producing method of the U.S. patent application Ser. No. 09/129,985 now U.S. Pat. No. 6,162,310, of the same inventor as the present patent application. The method can control the sizes, shapes and density of mutually communicating pores and communicating areas between every two pores distributed in the metal with the sponge like structure, in this way, physical and mechanical feature of the sponge like structure of the metal can be improved.

2. Description of the Prior Art

In the recent years, porous metal material has been found capability in improving specific weight, pressure resisting strength, toughness etc., and it has a single or compound features of fire-proof capability, sound insulation, heat insulation and magnetic wave disturbance-proofing etc. Thus techniques of development of porous metal material have been noticed by the related arts. In the markets, the already developed porous metals are divided into two classes depending on whether their pores are communicated mutually, i.e., the foamed metals and the air-venting metals.

In which, the pores in the foamed metals are independent without communication, and the foamed metals normally are applied on light weighted constructional material (noise absorber, anti-vibration material, collision buffering material, heat insulating constructional material). And as to the method of manufacturing of such material, the producing method of the U.S. patent application Ser. No. 09/129,985, now U.S. Pat. No. 6,162,310, of the same inventor as the present patent application is preferred. The prior method can effectively control shapes, sizes, volume and density of individual pores of foamed metal, and thus physical and mechanical feature of the sponge like foamed metal material can be improved.

However, the type of metallic tissue of the air-venting metal is provided with a lot of pores communicating with one another, it is more suitable for manufacturing filters, catalysts, sound mufflers, material for electrodes of batteries on heat exchangers, liquid separators, liquid flow adjusters, oxygen processors for purifying water, self-lubricating bearings, LSI heat emitting anti-vibration plate material, wall plates for ships/aircraft/spacecrafts, fillers for plywood etc. The methods for manufacturing it are only the conventional powder metallurgy, foundry of disappearing die, metallic fiber sintering process, foaming method of foam agent etc. A manufacturing technique with high cost of production might be used to make air-venting metal with irregular pore organization of which the pores can be communicated with one another, but it is lack of capability of controlling size, shape and density of tissue. Hence, the physical and mechanical features of the air-venting metal can not be improved, this limits improving of a single or the combined effects of fire-proofing, sound insulation, heat insulation or magnetic wave disturbance-proofing etc.

SUMMARY OF THE INVENTION

The object of the present invention is to improve the manufacturing technique in producing sponge like metal having independent air holes as stated in the U.S. patent application Ser. No. 09/129,985, now U.S. Pat. No. 6,162,310 and to develop another technique in easy producing sponge like air-venting metal with a lot of pores communicating with one another and of which the pores are effectively controllable in shape, size and density of tissue. Thereby, the sponge like metal with a lot of pores can be strengthened in its single or the combined effects of fire-proofing, sound insulation, heat insulation or magnetic wave disturbance-proofing etc.

To obtain the above stated object, the present invention has the following steps of selecting organic blanks, medium dipping, accumulation, baking, dipping with mortar in vacuum, drying, immersion, sintering, preheating and vacuum founding etc.

Wherein, when in selecting blanks, in principle, selection of blanks must be done among organic matters (it has less problem of environmental conservation), the shapes and sizes of the blanks are exactly the factors to decide the shapes and volume of the unit hollow pores in the porous sponge like structure; while the arranged form and degree of communication of the porous sponge like structure are controlled by an agglomeration mode in the stop of accumulation.

In the steps of accumulation, in order to effectively control the arrangement and degree of communication of the pores in the porous sponge like structure, the blanks possible of any of various sizes must be dipped with a layer of organic medium which stuck together by adherence, and are formed a shaped embryo after baking, the shaped embryo then is processed in the subsequent procedure.

While in selecting metallic melt and refractory mortar, suitable refractory mortar is selected in pursuance of the fact whether the porous sponge like metal to be made is of an alloy of high melting point or alloy of low melting point. It is attached by dipping on the exterior surface of the shaped embryo. After baking of the refractory mortar, a mixture formulated from water glass, an alloy of high melting point or alloy of low melting point shall be applied by dipping on the refractory mortar layer, for the purpose of increasing adherence between the refractory mortar and the selected metallic melt in the subsequent processing procedure. And the sponge like metal having pores communicating with one another and with desired tissue can be formed by vacuum founding after disappearing of the organic material and the blank by burning.

The present invention will be apparent after reading the detailed description of the preferred embodiments thereof in reference to the accompanying drawings.

DETAILED DESCRIPTION OF THE PREFERRED EMBODIMENT

Figure 1:
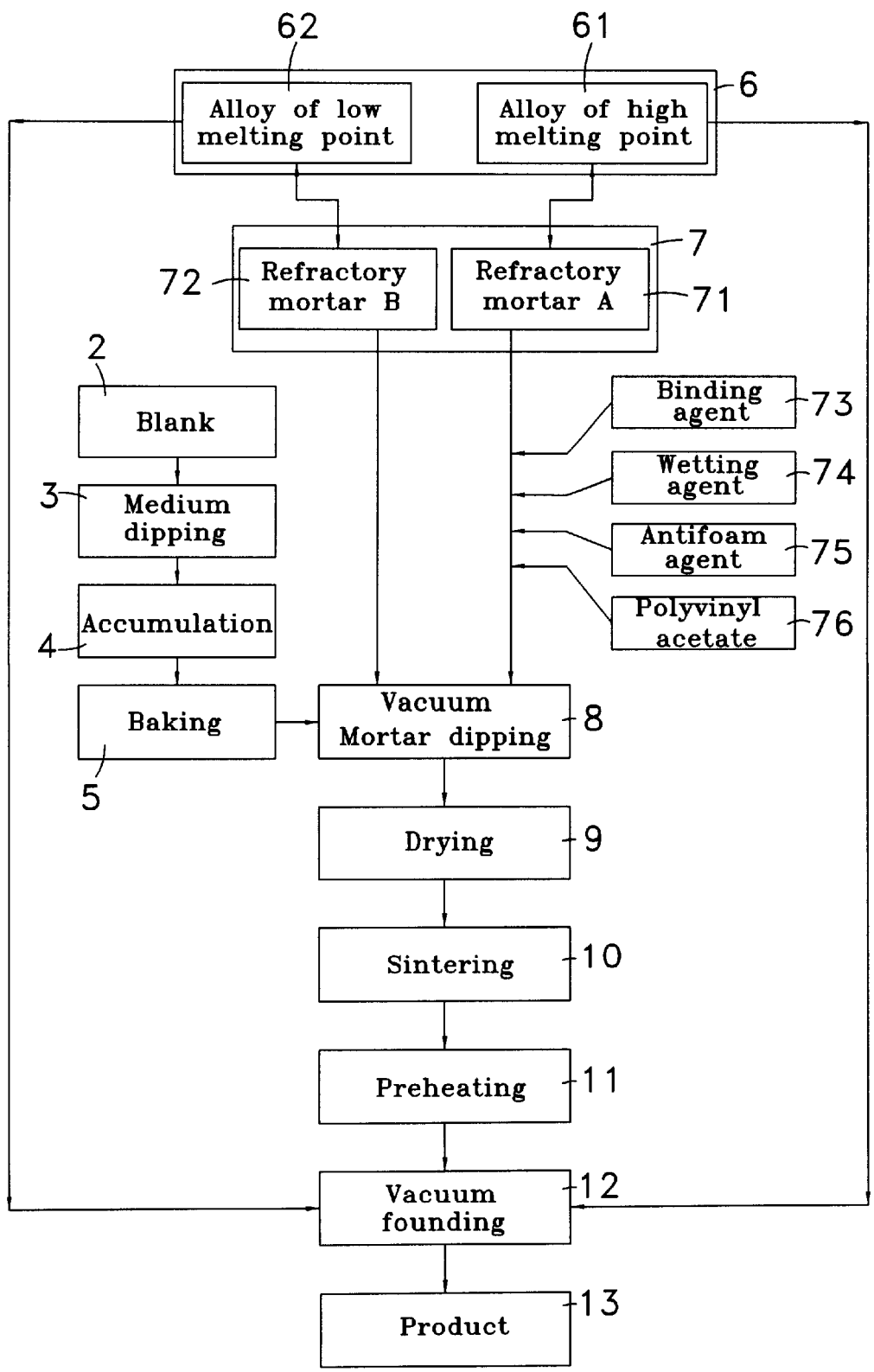
FIG. 1 is a flow chart of the process of manufacturing of the present invention.

Referring firstly to FIG. 1, the manufacturing method provided in the present invention for metal with a sponge like structure of which the density of tissue is controllable comprises mainly the steps of medium dipping 3 for blanks 2, accumulation 4, baking 5, dipping with mortar in vacuum 8, drying 9, sintering 10, preheating 11 and vacuum founding 12 etc. By the method, a sponge like metal product having pores communicating with one another can be formed.

Figure 2:
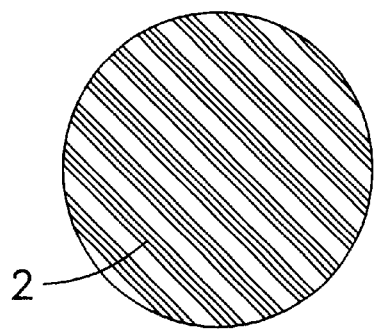
FIG. 2 is a schematic view of a round shaped blank with identical granular shape and size used in the present invention.

Before the above steps, the shape and size of the blanks 2 must be chosen, wherein:

When in selecting blanks 2, the blanks 2 selected shall be of organic matter, such as thermoplastic plastic granules, hard wax, or organic plant seeds or starch granules etc. The shapes of the organic blanks 2 are preferably chosen from or made as round granules (this is taken as an example as shown in FIG. 2), to be used as a die core for the pores communicating with one another.

Figure 3:
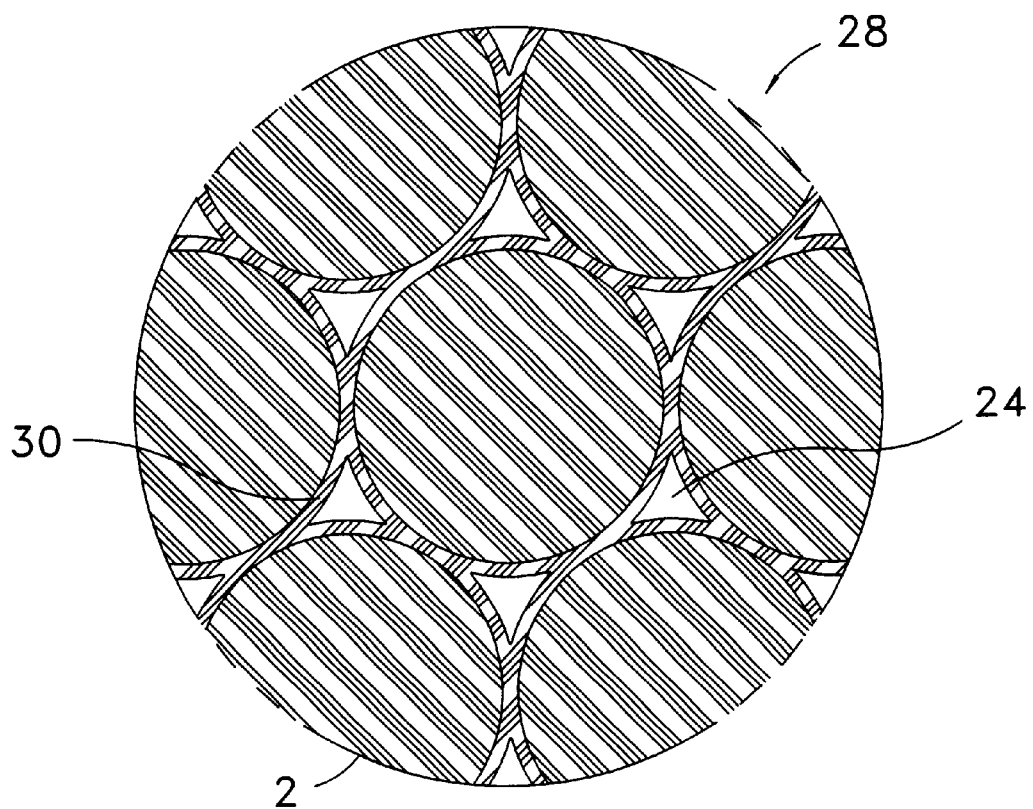
FIG. 3 shows a sectional view of a shaped embryo of the present invention formed from a blank enveloped and accumulated with an adhering organic medium.

When the organic blanks 2 are chosen, they must be dealt with by medium dipping 3. I.e., a plurality of blanks 2 are dipped with a layer of organic medium 30 (as shown in FIGS. 1 and 3). The organic medium layer 30 is preferably adhesive and capable of being air dried (such as organic plastic, organic wax), so that the organic blanks 2 can make binding by adherence. Then the organic blanks 2 are placed in a die frame and bind with one another by accumulation 4. When they are agglomerated, they are dealt with by baking 5 to form a shaped embryo 28 with the agglomerated organic blanks 2 and with a plurality of gaps 24 (as shown in FIG. 3).

Figure 4:
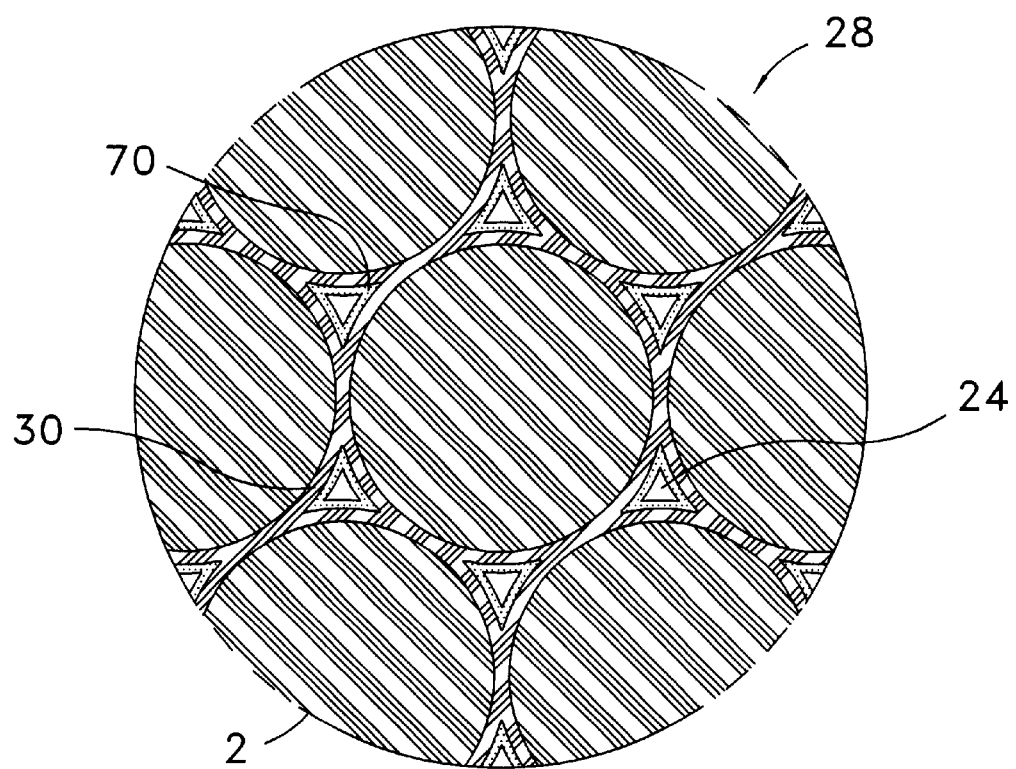
FIG. 4 is a sectional view showing the blank is dipped with a refractory mortar layer in addition to the organic medium layer.

Referring to FIG. 4, after the desired shaped embryo 28 is formed, it must be processed by vacuum dipping 8 with refractory mortar 7. In the process of selecting metallic melt 6 and refractory mortar 7, An A class refractory mortar 71 must be selected for metallic melt 6 of an alloy 61 with high melting point, and a B class refractory mortar 72 must be selected for metallic melt 6 of an alloy 62 with low melting point (as shown in table 1). The A class refractory mortar 71 or B class refractory mortar 72 must be provided with the following conditions:

1. resistance to hasty scouring of hot metallic melt;
2. smaller heat expansion for ensuring stability of the thickness of the refractory layer;
3. good high-temperature strength;
4. non-decomposable or non-crystalline metamorphic under high temperature;
5. good contact with metallic melt.

Based on the above stated conditions, the ingredients and characteristic of the refractory mortars in the following Table 1 can be chosen:

TABLE 1

Comparison for various refractory mortars in weight ratio of powder of their ingredients and in their temperature characteristic.

| Ingredients | $Al_2O_3$ | $ZrO_2$ | $SiO_2$ | $Na_2O$ | $Fe_2O_3$ | $TiO_2$ | CaO | MgO | Melting Point (° C.) |
|---|---|---|---|---|---|---|---|---|---|
| Quartz | 0.11 | — | 99.8 | — | 0.033 | 0.022 | Tr | Tr | 1700 |
| Melted quartz | 0.05 | — | 99.9 | — | 0.02 | 0.015 | 0.01 | 0.005 | 1700 |
| Melted aluminum oxide | 99.5 | — | 0.3 | 0.35 | 0.03 | 0.015 | 0.05 | 0.005 | 2050 |
| Aluminum Oxide (crystalline) | 99.0 | — | 0.1 | 0.02 | 0.4 | — | 0.07 | — | 2050 |
| Zirconium sand A | | 65.0 | 34.0 | — | 0.1 | 0.25 | — | — | 2300 |
| Zirconium sand B | 0.79 | Min 66.32 | Max 32.23 | — | Max 0.04 | Max 0.2 | — | — | 2300 |
| Zirconium oxide (stabilized) | 0.39 | 94.6 | 0.35 | — | 0.19 | 0.21 | 3.52 | 0.46 | 2690 |
| Calcium aluminum oxide | 79.0 | | 0.1 | 0.5 | 0.3 | — | 18.0 | 0.4 | 1700 |
| Baked clay | 41.6 | — | 52.8 | 1.2 | 1.5 | 2.5 | 0.3 | 0.4 | — |
| Flint granule | 47.5 | — | 47.7 | 0.9 (total Alkali) | 1.1 | 2.5 | 0.2 | 0.2 | — |
| Melted Mullite | 76.2 | — | 23.0 | 0.44 | 0.13 | 0.11 | 0.05 | 0.05 | 1080 (decomposing) |
| Mullite | 73.5 | — | 22.4 | | 0.9 | 3.2 | — | — | 1080 (decomposing) |
| Kyanite | 57~60 | — | 37~41 | | 0.08~0.4 | 1.2 | 0.3 | 0.3 | 1550 co-melting |
| Molochite | 42~43 | — | 54~55 | $Na_2O$ 1 $K_2O$ 1.5~2.0 | 0.75 | 0.08 | 0.1 | 0.1 | — |

In order to agglomerate the multiple refractory powder ingredients in Table 1 to form mortar 7, it is absolutely necessary to use binding agents 73, such as sodium silicate ($Na_2SiO_4$), ethyl silicate or colloidal silicate ($SiO_2$) etc., these binding agents 73 make adherence by the function of silica gel therein; in principle, the binding agent 73 used in the present invention is more likely colloidal silicate which is more available and more convenient for operation, colloidal silicate has been being used in fine founding for many years, and can be easily obtained in the markets, and the chemical characteristic of colloidal silicate is very stable, it is not damaged unless it is stored in an environment below the ice freezing point, and so long as it is dehydrated to dry, it absorbs no more water for restoring its original nature, in view of this, colloidal silicate is very stable in storing as well as using, and this is the main reason that the present invention uses colloidal silicate as the binding agent 73.

More specifically therefore, when an alloy 61 of high melting point is used as a metallic melt 6 in the present invention, the A class refractory mortar 71 can be chosen from Table 2 below:

TABLE 2

Composition and characteristic of the A class refractory mortar.

| | Types of Mortars | | |
|---|---|---|---|
| Items | Mortar a | Mortar b | Mortar c |
| Colloidal Silicate ($SiO_2$) 30% (l) | 13.6 | 11.3 | 11.3 |
| Zirconium Powder (325 mesh)(kg) | 45.3 | 45.3 | 40.8 |
| Interface Activator (C.C) | 10.0 | 10.0 | 10.0 |
| Others | — | Water 4.5 (l) | Quartz 4.5 (kg) Water 4.5 (l) |
| Character- Stickness (S) istic | (Zahn Cup5#) 9-30 | (ZahnCup5#) 9-30 | (ZahnCup5#) 9-30 |
| Specific Weight | 2.90–2.95 | 2.70–2.75 | 2.65–2.70 |

On the other hand, when an alloy of low melting point 62 is used as a metallic melt 6 in the present invention, the B class refractory mortar 72 is obtained by choosing gypsum refractory material, gypsum itself carries crystal water of two molecules ($CaSO_4.2H_2O$), when it is used as a refractory material, water in the gypsum is partially removed depending on the working time and curing time required, when the remaining water is in the scope of 1–1½ molecules [$Ca SO_4.(1-1½) H_2O$], the gypsum is turned into plaster, it only needs to add water therein when in preparation, and is normally available in the markets.

When a suitable refractory mortar 7 is selected according to the type and characteristic of the metallic melt 6 used, the A class refractory mortar 31 chosen when an alloy of high melting point 61 is used must be prepared in pursuance of the following points:

a. The A class refractory mortar 71 and the binding agent 73 are uniformly mixed under high rotation speed of 1725 rpm of a swirl impeller in an agitating barrel, and then are put into a rotating barrel for vacuum dipping 8. Wherein, it must be noted that when preparation of the mortar is completed, the agitating barrel must be kept running slowly before the stop of vacuum dipping 8, so that the A class refractory mortar 71 and the binding agent 73 can be kept in the best state wherein they are in a most uniform mixing state.

b. Control of stickiness of the mortar is normally measured by Zahn cups 4# and 5#, if a Zahn cup 5# is used for preparation, the stickiness obtained at 9–30 seconds is more suitable (referring to the Table 2).

c. Add in a wetting agent 74 which is an interface activator in the A class refractory mortar 71 and the main purpose thereof is to make the mortar easier in sticking on the organic medium 30 made from plastic, wax, or starch. Generally, if ethyl silicate is used as the binding agent 73, it can get better wetting quality, and therefore does not need the wetting agent 74.

d. Add in an antifoam agent 75 (n-Octyl alcohol) which can reduce foams in the mortar, the agent will not gelatinize the mortar, hence it provides stability in use.

e. Add polyvinyl acetate 76 to increase wet strength of the A class refractory mortar 71, when wax is chosen as the organic medium 30 for the step of vacuum dipping 8, the polyvinyl acetate can prevent the wax from separation; and when in sintering 10, the polyvinyl acetate 76 can prevent the organic medium 30 from breaking; and after the step of sintering 10, the polyvinyl acetate 76 can have the effect of removing the organic substance in the refractory layer 70.

After preparation of the above stated suitable refractory mortar 7, equipment for vacuum mortar dipping 8 must be used and the shaped embryo 28 shall be placed in this equipment, the air in the equipment is drawn out to form a vacuum state. Then refractory mortar 7 is poured in to adequately penetrate into the gaps 24 of the shaped embryo 28. Then the shaped embryo 28 is taken out and is dealt with in the drying step 9 under the temperature of 130° C.±20° C., so that the exterior layer of the shaped embryo 28 is formed a hardened refractory layer 70.

Figure 5:
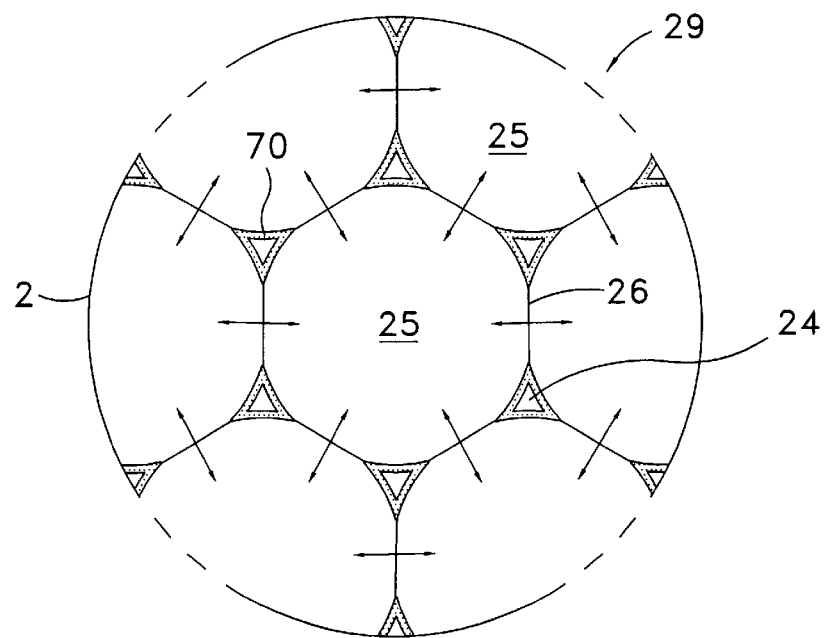
FIG. 5 is a schematic view of a ceramic shell with pores communicating with one another formed after disappearing by burning of the blank and organic medium of the present invention.

After completion of the above steps, the shaped embryo 28 must be dealt with by sintering 10 in high temperature of 800° C.~1800° C. to make disappearance of the blanks 2 and organic medium 30 in the refractory layer 70 by burning. At this moment, the refractory layer 70 dealt with in sintering forms ceramic shells 29 with resistant strength, the ceramic shells 29 are distributed to have mutually communicating pores 25 and communicating areas 26 between every two pores 25, and gaps 24 are distributed around the pores 25 and communicating areas 26 (as shown in FIG. 5).

Figure 6:
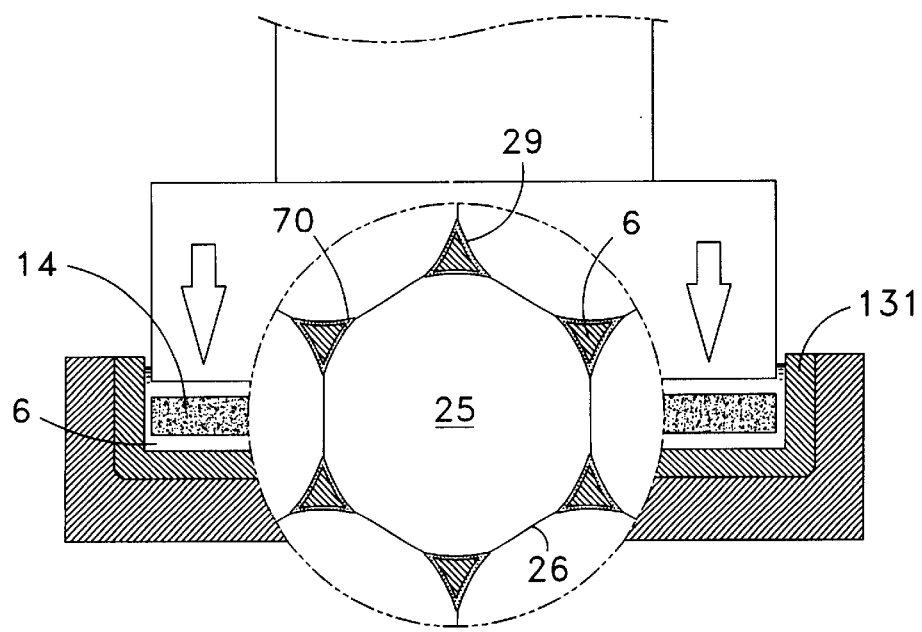
FIG. 6 is a schematic view showing vacuum founding of the present invention in a vacuum founding equipment of metallic material having the ceramic shell with pores communicating with one another in it.

Thereafter, an equipment for vacuum founding 12 with heating function with a constant temperature is used to practice a preheating step 11 and casting of the metallic melt 6 (referring to FIG. 6). Wherein, a die cavity 131 in the equipment for vacuum founding 12 with heating function with a constant temperature must be used in advance to deal with the ceramic shells 29 in the shape and construction of sponge in the die cavity 131 by preheating 11 before casting of the metallic melt 6. This is a very important procedure by the fact that after preheating 11 before casting, the metallic melt 6 taking the gaps 24 on the ceramic shells 29 (also referring to FIG. 3) as flow ways is easier to flow all around and is filled in the gaps 24 to be founded. This is true especially for an alloy 62 having low melting point used as the metallic melt 6. It is even more necessary to get aiding from the preheating 11 for fluidity of the melt in the ceramic shells 29 to smoothly promote the vacuum founding 12, and therefore the preheating 11 is absolutely helpful.

Moreover, in the process of the vacuum founding 12 (as shown in FIG. 6), i.e., when the die cavity 131 having the ceramic shells 29 placed therein has air therein drawn out to form a vacuum state to facilitate pouring in of the metallic melt 6, degree of communication of the metallic melt 6 in the gaps 24 in the ceramic shells 29 is increased.

A metal article 13 shaped by press founding according to the above stated steps has its two side walls enveloped and dressed to by the metallic melt 6 having been solidified. The solidified metallic melt 6 fills in the gaps 24, so that the pores 25 and communicating areas 26 are all enveloped by the solidified metallic melt 6 to form the tissue having pores communicating with one another in the sponge like metal article 13.

Sizes, shapes and density of the pores 25 and communicating areas 26 and the gaps 24 formed among them are controlled by selection of sizes and shapes of the organic blanks 2 and thickness of the organic medium 30 in medium dipping 3 after the steps of accumulation 4 and baking 5.

When the metal article 13 is used as a sound insulating wall, the two side walls of the metal article 13 are milled to reveal the pores 25 and communicating areas 26. This can increase the effect of sound absorbing. It is certain that in the case where fire-proofing or heat insulation is regarded as important, the side walls of the metal article 13 can get the effect of heat insulation without being milled. No matter the side walls of the metal article 13 are dealt with milling, they still maintain a single or the combined effects of pressure resistance, tenacity, fire-proofing, sound insulation, heat insulation or magnetic wave disturbance-proofing etc. And by communication of the interior pores thereof, the porous sponge like structure can have better capability for insulating sound waves.

In conclusion, in the method for manufacturing the sponge like metallic material of the present invention, of which the shapes and sizes of the pores are controllable, blanks are agglomerated into a shaped embryo and dipped with a layer of organic medium which will disappear by burning, thereby to get the sponge like metallic structure -with interior pores communicating with one another. This effectively increases practicability and utility of the sponge like metallic structure and thus is a highly valuable technique.

Having thus described my invention, what I claim as new and desire to be secured by Letters Patent of the United States are:

1. A method for producing a porous metallic structure, comprising the following steps:
   a) selecting blanks,
   b) processing said blanks through organic medium dipping,
   c) processing said blanks through accumulation so as to form an embryo,
   d) baking said embryo to form a shaped embryo comprising a plurality of blanks and gaps therebetween,
   e) selecting an alloy,
   f) selecting a refractory mortar,
   h) dipping said shaped embryo in said refractory mortar under vacuum,
   i) drying said shaped embryo and said refractory mortar so that said refractory mortar forms a hardened refractory exterior layer on said shaped embryo,
   j) sintering said shaped embryo,
   k) preheating said alloy and said shaped embryo, and
   l) casting said shaped embryo with said alloy in a vacuum, such that molten alloy fills said gaps in said shaped embryo; wherein
   said refractory mortar is selected according to melting point characteristics of said alloy, and
   said blanks are granular organic materials, said granular organic materials are chosen according to desired shapes, sizes, and density of said pores and communicating areas between adjacent pores, such that
   shapes, sizes, and density of pores of said porous metallic article are controlled.

2. The method for producing a porous metallic structure as claimed in claim 1, wherein:
   said organic medium is organic plastic or organic wax, said organic medium being easily dried by heat application, and
   said organic medium is eliminated by burning.

3. The method for producing a porous metallic structure as claimed in claim 1, wherein:
   said refractory mortar is prepared by adding a binding agent, a wetting agent, an antifoam agent, and polyvinyl acetate.

* * * * *